United States Patent Office 3,363,353
Patented Jan. 16, 1968

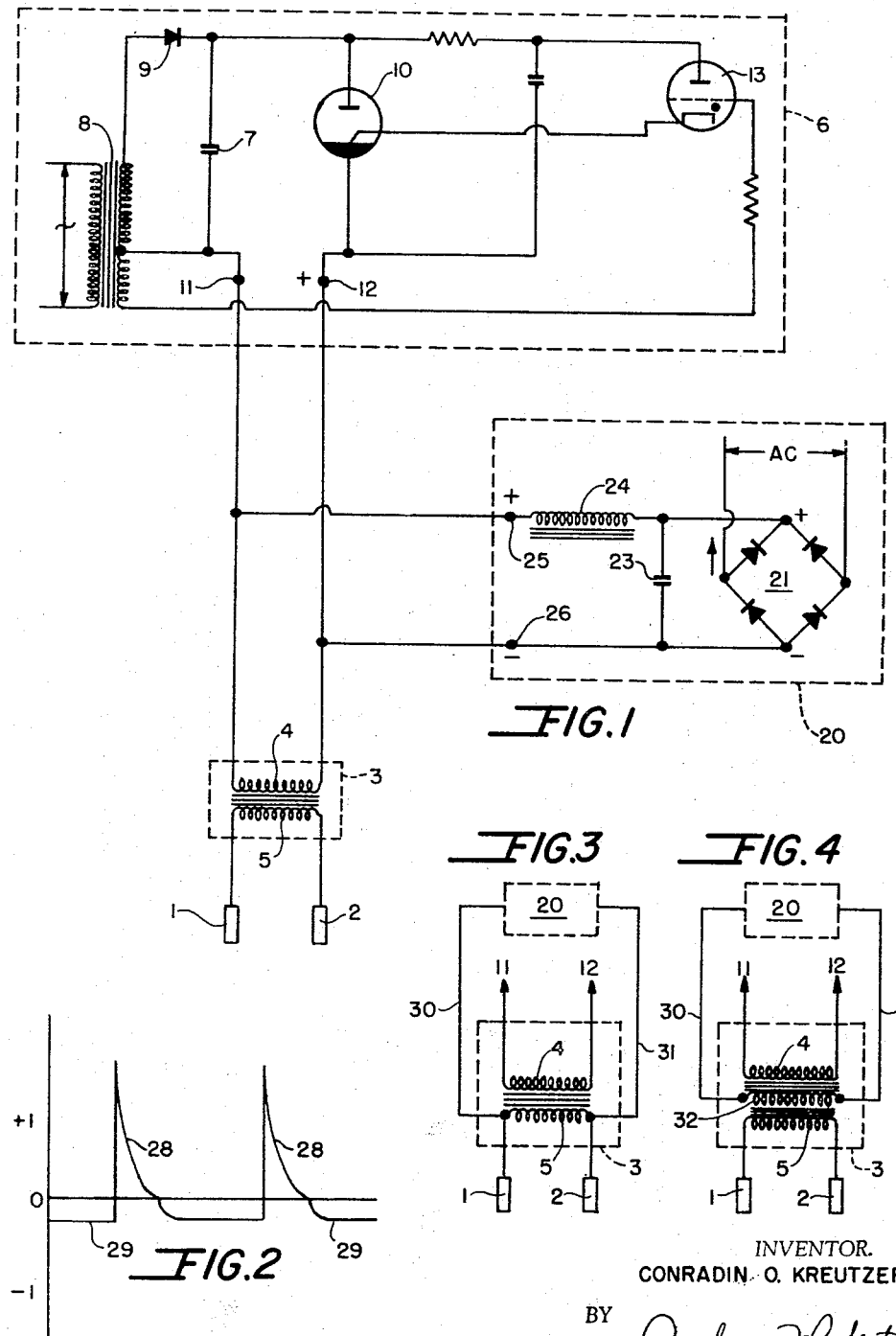

3,363,353
METHOD OF ELECTRIFYING THE FISHING WATERS BETWEEN ELECTRO - FISHING ELECTRODES
Conradin O. Kreutzer, Lewes, Del., assignor to Smith Research and Development Company, Inc., Lewes, Del., a corporation of Delaware
Continuation-in-part of application Ser. No. 198,666, May 29, 1962, which is a continuation-in-part of application Ser. No. 110,078, May 15, 1961. This application Mar. 17, 1964, Ser. No. 352,581
6 Claims. (Cl. 43—4.5)

ABSTRACT OF THE DISCLOSURE

An electrofishing method wherein electropositive and negative currents are passed alternately in opposite directions through the water between the electrodes. The positive current is conventionally composed of short, widely-spaced, high-voltage electrofishing impulses, which scare, attract, or stun fish and which inherently corrode the anode, "calcify" the cathode and thus damage the electrodes to an extent determined by the power or energy of the positive current. The negative current is made of equal energy to effect a complete repair of the damage without appreciably affecting the fish. Its voltage is low enough to avoid scaring, attracting or stunning the fish and its time long enough to render its energy equal to the energy of the positive current. Where the positive electrofishing impulses are transformed in a pulse transformer, the power handling capacity of transformer can be increased without changing its size and weight (or its size and weight is reduced without changing its power handling capacity) by flowing the negative current through a winding of the transformer in a direction opposite to the (core-magnetizing) direction of the electrofishing impulses.

---

This application is a continuation-in-part of my now abandoned, copending application Ser. No. 198,666 filed May 29, 1962, as a continuation-in-part of my now abandoned application Ser. No. 110,078, filed May 15, 1961.

In the electro-fishing art, it is known that the fishing waters between electro-fishing electrodes may be electrified by continuous or discontinuous DC and by continuous or discontinuous AC. Each suggested form of DC normally sets up (around the electro-fishing anode) a positive electrical field having a somewhat spherical electro-taxis section within which fish are electrically influenced to swim toward and concentrate about the electro-fishing anode and also having, if the peak electrofishing voltage is high enough, a somewhat spherical electro-narcosis section, which is located between the electro-taxis section and the electro-fishing anode and within which fish are stunned. On the other hand, each suggested form of AC normally sets up (around each electrode) alternately positive and negative electrical fields which may have an electro-narcosis section but which cannot have a fish orienting and concentrating electro-taxis section.

Since all salts waters are highly conductive, economic considerations normally eliminate the use of continuously flowing DC and AC and dictate the use of pulse current. Since scattered fish, which are stunned before they are concentrated, are difficult to capture or recover, practical considerations normally eliminate the use of AC pulses and dictate the use of short DC pulses.

The use of short DC pulses has several disadvantages. Such pulses corrode the anode and calcify the cathode unless these electrodes are composed of or plated with platinum, which renders them quite expensive to manufacture and to replace if lost. Furthermore, DC pulses are difficult to transmit over long distances while long transmission distances, ranging up to one mile between the source of the pulses and the fishing gear, are not uncommon.

The principal object of this invention is to provide an improved method of electrifying the electro-fishing waters which has the advantages but not the disadvantages of short DC electro-fishing pulses. More particularly, the principal object of this invention is to provide a method of using short DC electro-fishing pulses in a manner which retains their advantages and substantially overcomes their disadvantages.

Another important object of this invention is to provide a method of using pulse current to create an electrical field having an electro-taxis fish concentrating section and, at the same time, reduce anode corrosion and cathode calcification sufficiently to render feasible the use of electrodes conventionally composed of one or more of the relatively inexpensive metals.

The foregoing objects of the present invention are attained by lectrifying the fishing water in the following manner: (a) flowing a succession of short high-voltage high-amperage electro-fishing impulses in one direction at spaced intervals; and (b) reversely flowing a current of substantially lower voltage and amperage and longer duration at alternate intervals. In other words, I use a continuous or discontinuous AC composed of differential alternations wherein the electro-positive current, corresponding to each alternation of positive polarity, comprises a short high-voltage high-amperage DC impulse (i.e. a DC electro-fishing impulse) while the electronegative current, corresponding to each alternation of negative polarity, comprises a DC current of substantially lower voltage and lower amperage and longer duration. With this arrangement, each DC electro-fishing impulse operates conventionally not only to create (around the electro-fishing anode) a positive electrical field having an electro-positive fish-orienting or taxis section with accompanying fish concentration but also to corrode the anode and calcify the cathode. The advantages of this arrangement are derived from the reversely flowing or negative alternation which flows during each alternate interval and operates: (a) to create around said electro-fishing anode (now the cathode) a negative electrical field of a lesser intensity, which is insufficient to affect the fish concentrated by said electro-positive fish-orienting field; and (b) to reverse the corrosion-calcification process and, in so doing, tend to restore the electrodes to their respective original undamaged condition. Consequently, the reversely flowing current may be aptly designated as a counteracting current of lower voltage and longer duration.

To reduce transmission line losses, the use of DC pulse transformers has been proposed but these become fairly large due to the high DC induction; hence, size limits their application. In other words, as heretofore designed and operated for electro-fishing purposes, DC impluse transformers have had a relatively small capacity when made in readily usable sizes.

Other important objects of the invention are: (a) to reduce transmission lines losses; and (b) either (1) to increase the power handling capacity of DC impulse transformers very substantially without necessarily changing their structure, size or weight, or (2) to reduce their size and weight substantially without reducing their power handling capacity.

The last mentioned objects of the present invention are attained (a) by conventionally feeding said DC electro-fishing impulses at spaced intervals in one direction through one winding of an electro-fishing impulse transformer so as to magnetize the core in one direction and (b) by contemporaneously feeding said counteracting current at alternate intervals in a counter-magnetizing direction through the same winding or a different winding of said transformer. For example, when DC electro-fishing impulses are fed in one direction through the primary winding of the transformer so as to magnetize the core in one direction, the use of a "low" continuous or discontinuous direct current flowing reversely in the same primary winding (or flowing in the counter-magnetizing direction in any other winding of the transformer) permits the magnitudes of the transformer's operating voltage and current to be increased as much as four times each with a resultant power increase ranging up to sixteen times its conventional capacity.

The transformer phase of this invention is illustrated in FIGS. 1–4 of the drawings wherein:

FIG. 1 is a diagram of the circuit means for practicing my improved type of impulse transformer operation with a counter magnetizing direct current in the primary;

FIG. 2 illustrates the positive and negative currents flowing in the primary winding of the impulse transformer shown in FIG. 1; and FIGS. 3 and 4 are circuit diagrams indicating two arrangements for flowing a counter magnetizing current through the secondary winding and a special winding, respectively, of an impulse transformer.

Figure 5:
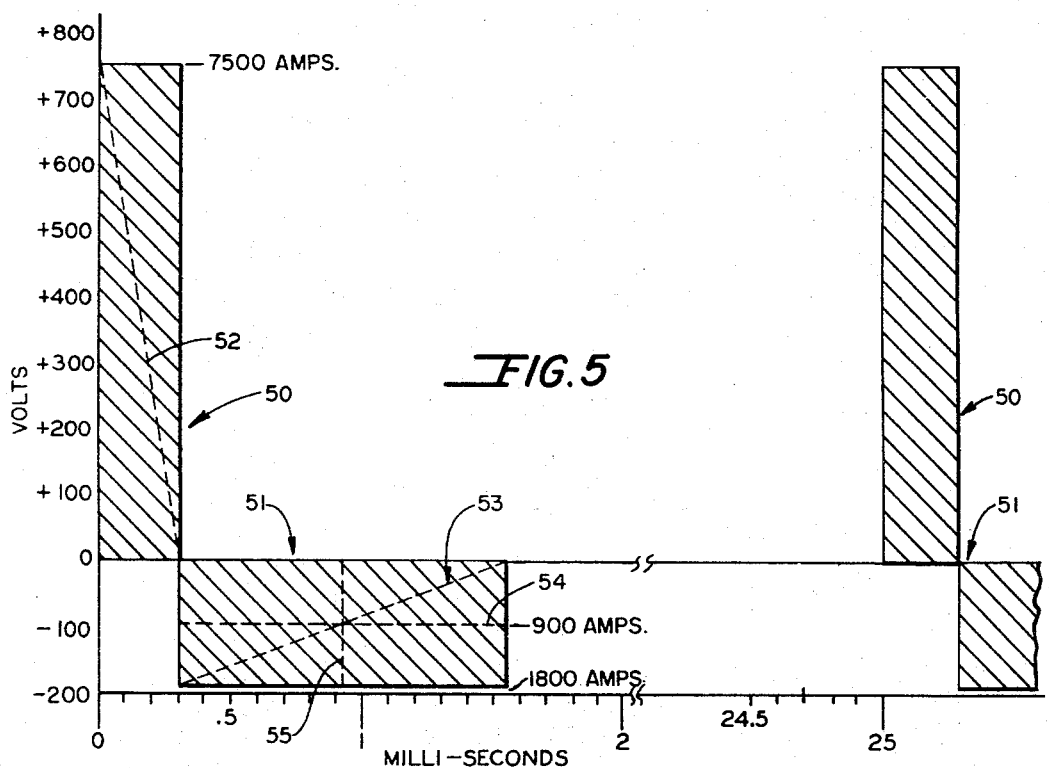
Figure 6A:
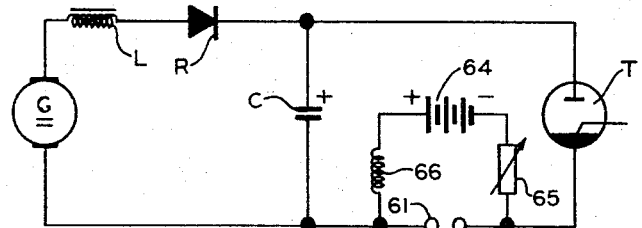
Figure 6B:
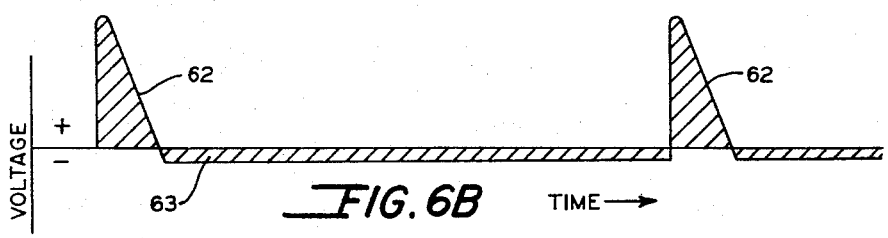
Figure 7A:
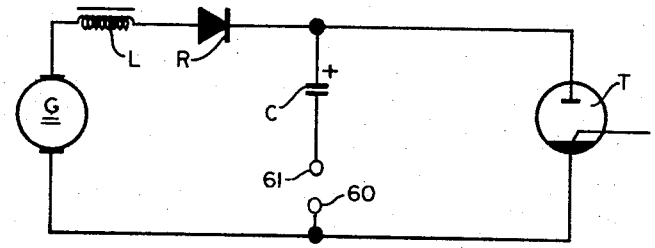
Figure 7B:
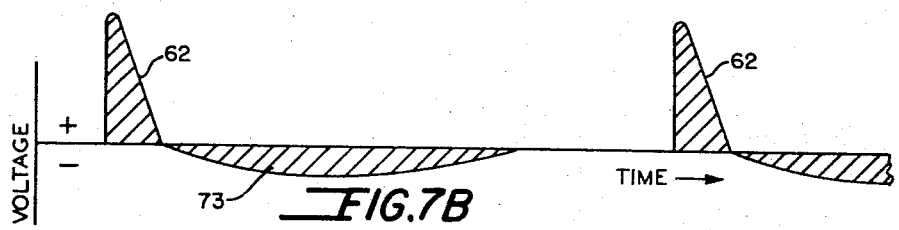
Figure 8A:
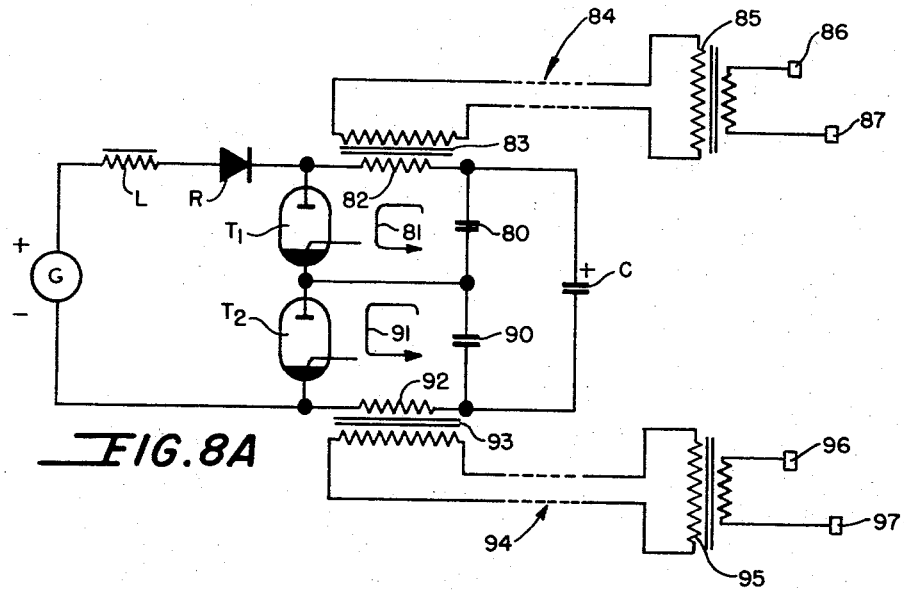
Figure 8B:
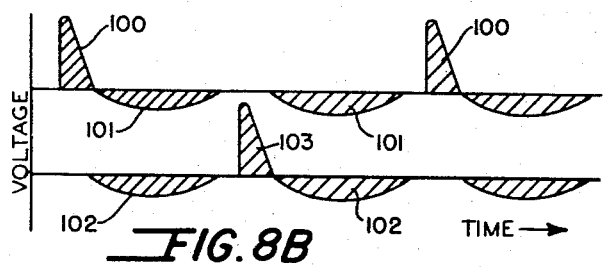

The electrode corrosion phase of the present invention as illustrated in FIGS. 5–8 of the drawings wherein:

FIG. 5 illustrates a differential AC current composed of alternations of theoretical shape and size to facilitate an explanation of the principle of the present invention;

FIGS. 6A and 6B respectively disclose one circuit embodiment for practicing my invention and the continuous type of differential AC current it employs;

FIGS. 7A and 7B respectively disclose another circuit embodiment for practicing my invention and the discontinuous type of differential AC current it employs; and FIGS. 8A and 8B respectively disclose still another circuit embodiment for practicing both phases of my invention and the discontinuous type of differential AC current it employs.

BROAD ASPECT OF INVENTION

Broadly speaking, my invention resides in the use of differential AC composed of (a) electro-positive alternations in the form of short high-voltage high-amperage DC electro-fishing impulses, which provide a current-time based force in one direction and (b) electro-negative alternations in the form of longer lower-voltage lower-amperage current to provide, in the opposite direction, a substantially equivalent counter-balancing current-time based force. A differential AC of this character may be used: (a) in an impulse transformer, to reap the counter-magnetizing benefits of the negative current in accordance with the transformer phase of my invention; and (b) in the fishing waters, to reap the counter-corrosion benefits of the negative current in accordance with the corrosion phase of my invention.

TRANSFORMER PHASE OF INVENTION

At the outset it should be understood that DC (direct current) impulse transformers, designed for electro-influencing purposes such as electro-fishing, are quite similar to but larger than impulse transformers used in radar equipment. They are larger because radar impulse transformers are designed for micro-second impulses whereas electro-fishing impulse transformers are designed for milli-second impulses. For the principles governing impulse transformer design see Fischer's 1958 Leipzig edition of "Radartechnik" and Reuben Lee's "Electronic Transformers and Circuits" published by John Wiley & Sons in 1947. For the specifications of an operative embodiment of an electro-fishing impulse transformer, see the April 1962 edition of "Electro-Trawling in Shallow Sea Water" by Smith Research & Development Co., Inc. (copies available in the U.S. Library of Congress, U.S. and Canadian Patent Offices and Lewes, Delaware Public Library).

APPARATUS OF FIG. 1

The apparatus shown in FIG. 1 includes: a first circuit means for generating DC (direct current) impulses of the electro-fishing type, transforming them in a DC impulse transformer and then firing them through the fishing waters, and a second circuit means for reversely feeding a counter magnetizing direct current into the DC impulse transformer.

By "DC impulses of the electro-fishing type," I mean a discontinuous direct current of the spaced high-voltage high-amperage impulse type disclosed (or usable in electro-fishing apparatus or operations of the character disclosed) in prior U.S. patents on electro-fishing subjects matter. Among these are: #2,764,832 dated Oct. 2, 1956; #2,792,659 dated May 21, 1957; #2,836,735 dated May 27, 1958; #2,850,832 dated Sept. 9, 1958; and #2,850,833 dated Sept. 9, 1958.

First generating circuit means

This circuit, as shown, conventionally comprises: a pair of electro-fishing electrodes 1 and 2; and impulse transformer 3 having primary and secondary windings 4 and 5 and being arranged with its secondary winding 5 connected to the electro-fishing electrodes; and an impulse generating circuit 6 connected to deliver impulses to the primary winding 4 of the impulse transformer 3.

The impulse generator 6 of FIG. 1 is also disclosed in my U.S. Patent #3,043,041 dated July 10, 1962. Briefly stated, it comprises: an impulse capacitor 7; a charging circuit therefor serially including said capacitor 7, the secondary winding of a power supply transformer 8 energized with commercial AC current and a rectifier 9; a discharging circuit therefor serially including said capacitor, an ignitron 10 and a pair of spaced negative and positive load terminals 11 and 12, which are to be connected to the load; and an ignitron firing circuit containing a thyratron 13 operatively connected to render the ignitron 10 conductive during certain periods such as each alternation in which the rectifier 9 functions to block the flow of current from the power supply transformer 8.

When the thyratron 13 renders the ignitron 10 conductive, the capacitor 7 will be connected across the generator load terminals 11 and 12 and thus discharge a high-voltage DC impulse through the primary winding 4 of the impulse transformer 3. This causes the secondary winding 5 of the impulse transformer to energize electrodes 1 and 2. If these electrodes are submerged in water, a high-voltage high-amperage DC electrode-fishing impulse will be fired through the water.

Second reverse current circuit means

Now, in accordance with the transformer phase of my invention, I provide means to supply continuous or discontinuous DC to the primary 4 of the impulse transformer 3 in a direction opposite to the DC electro-fishing impulses from the generator 6. The reverse current has a peak voltage which is substantially lower than the peak voltage of the DC electro-fishing impulse and is of substantially longer duration. It definitely functions: (a) to eliminate the residual magnetic flux of the disturbing field; and (b) to reverse the magnetism in the iron core before the next DC electro-fishing impulse is fired. Preferably it functions to build the reverse magnetic flux to a density equal to the maximum density caused by the preceding electro-fishing impulse.

This feature of eliminating the residual magnetic flux and reversing the magnetic sign of that flux is believed to be largely responsible for the greatly improved results provided by this invention. It decreases the rise of the disturbing field caused by the electro-fishing impulse and thus not only lessens the maximum value of the disturbing field in the transformer iron core during an impulse but also enables impulses of greater power to be used.

While any suitable means may be used to supply the reverse current, the illustrated circuit means 20 comprises: a bridge rectifier 21 having its input terminals connected across an AC power supply; a filter condenser 23 bridging the output terminals of the rectifier 21; and a choke coil 24 connecting one output terminal of the rectifier 21 to a load terminal 25 with the other rectifier output terminal being connected directly to a load terminal 26. The positive load terminal 25 of the reverse current circuit means and the negative terminal 11 of impulse generator 6 are both connected to one terminal of the impulse transformer primary winding 4 while the positive generator load terminal 12 and the negative reverse current circuit terminal 26 are both connected to the other terminal of the primary winding 4.

Operation

While the operation should be clear from the foregoing, it may be noted that the generating circuit means 6 feeds one high-voltage high-amperage DC electro-fishing impulse 28 (having high peak values of both voltage and amperage) in one direction through the transformer primary 4 during every other alternation of each cycle of the AC power supply 8 while the reverse current circuit means 20 (a) attempts to feed a continuous low-voltage low-amperage direct current 29 in the opposite direction through the transformer primary 4 during all alternations of each current cycle of the AC power supply and (b) is operative to feed said current 29 in the opposite direction continuously during each interval between successive electro-fishing impulses 28.

It will, of course, be understood that the bridge rectifier 21 produces a full wave pulsating direct current, which is filtered by the filter condenser 23 and choke 24 and which is fed to the primary winding 4 of the impulse transformer 3. The choke coil 24 also prevents the electro-fishing impulses 28 of the impulse generator 6 from flowing through the reverse current circuit means 20.

The circuit of FIG. 1 operates at a spaced impulse frequency which is related to the AC power line frequency. Thus, with 60 cycle commercial AC, it may operate at one impulse every second alternation or 60 impulses per second. With the impulses capacitor 7 discharging each DC electro-fishing impulse within 3/10 of one milli-second and with an impulse frequency of 60 impulses per second, successive impulses will be spaced approximately 16.4 milli-seconds apart.

Of course the thyratron 13 may be operated by conventional means to render the ignitron 10 conductive at a different frequency. For example, it may render the ignitron 10 conductive every fourth alternation so that the apparatus operates at an impulse frequency rate of 30 impulses per second.

A reverse DC need not flow during the 0.3 milli-second period of each electro-fishing impulse 28. With 60 impulses per second, the reverse current must flow during the 16.4 milli-second interval between the end of each electro-fishing impulse and the beginning of the next successive electro-fishing impulse but it need not flow continuously during that interval. In an electro-fishing operation, for example, the maximum voltage of this reverse or counteracting current should be such that its electro-negative field does not noticeably orient the fish in the waters embraced by the fish-orienting section of the electro-positive field created by the electro-fishing impulse. Furthermore, the longer duration of that reverse current should be such that its minimum iron core demagnetizing effect substantially reduces and preferably eliminates the residual magnetic flux of the disturbing field while its maximum effect in the counter-magnetizing direction should do no more than substantially equal the corresponding total effect of the higher powered DC electro-fishing impulse which may be used.

Under optimum conditions, the higher powered short electro-fishing impulses and the lower powered long counteracting impulses cause the pro and con magnetic curves of the iron core to average out at a value approximating zero. In other words, the negative portion of the magnetic hysteresis loop equals and balances out the positive portions of that loop; hence, the total magnetizing force of the electro-fishing impulse in one direction and of the counter-magnetizing current in the opposite direction are equal. In each case, the total magnetizing force may be stated as the multiplication product of (a) the average or arithmetical mean value of the magnetizing current, (b) the number of magnetizing turns and (c) the duration time of the impulse. Accordingly, a reverse or counter-magnetizing current, which is within the above indicated ranges of strength and duration, may be designated as an "electro-negative current of equivalent counter-magnetizing force."

Advantages

As heretofore indicated, the operation of the reverse current means 20 enables the impulse transformer 3 to be operated at a capacity sixteen times higher than would conventionally be the case. For example, with an impulse transformer primary conventionally designed to receive an input pulse having a peak voltage of 500 volts and a peak current of 625 amps. I find that, by operating the DC source 20 to provide a continuous reverse current of equivalent counter-magnetizing force, it becomes possible to operate the impulse transformer primary with an input pulse having a peak voltage of 2000 and a peak amperage of 2500. In this way, the capacity of the transformer is increased sixteen times.

All other things being equal, the magnitude of a (FIG. 2) reverse current of equivalent counter-magnetizing force depends upon the pulse "length" or duration. This is illustrated in the following Table I wherein the number of primary turns is assumed to be 284.

TABLE I

| Impulse Transformer Primary | Electro-Positive Current | Electro-Negative or Reverse Current | | |
|---|---|---|---|---|
| | | 40 P/S | 60 P/S | 90 P/S |
| | | MS/NP For AC-Cyc $t$ of 25 MS | MS/NP For AC-Cyc $t$ of 16.7 MS | MS/NP For AC-Cyc $t$ of 11.1 MS |
| Pulse Time ($t$), ms | 0.3 | 24.7 | 16.4 | 10.8 |
| Peak Amps | 2,500. — | 6.83 | 10.3 | 15.62 |
| Aver. Amps. (Iam) | 563. — | 6.83 | 10.3 | 15.62 |
| Primary Turns (N) | 284. — | 284. — | 284. — | 284. — |
| $t \times Iam \times N$ | 48,000 | 48,000 | 48,000 | 48,000 |

In Table I:
  (a) P/S designates the negative pulse rate per second which equals the AC cycles per second.
  (b) MS/NP designates the negative pulse time in milli-seconds for the indicated AC cycle times (AC-Cyc $t$) of 25, 16.7 and 11.1 milli-seconds, respectively.

If the foregoing impulse transformer has a step-down ratio of 4 to 1 the secondary voltage will now be 500 volts and the secondary current 10,000 amps. All of this is accomplished without any appreciable change in structure, size or weight of the impulse transformer.

My preferred embodiments inherently have other advantages. For example, unless the submerged electrodes are made of platinum, the electro-fishing anode corrodes as it discharges current into the water while the electro-fishing cathode "calcifies" as it receives current from the water. By "calcify" I mean that certain salts (probably calcium salts) will be deposited upon the cathode and these salts tend to insulate it electrically from the water. However, under the impulse time and differential AC voltage and amperage conditions indicated, anode corrosion and cathode calcification are substantially minimized if not eliminated because each electrode functions alternately as anode and cathode. Furthermore, under such conditions, the reverse current does not countermand or otherwise nullify the fish-orienting action of the electro-fishing impulses.

APPARATUS OF FIGS. 3 AND 4

The reverse current circuit means 20 continuously feeds an effective low-voltage low-amperage counter-magnetizing direct current through lines 30, 31 to the secondary 5 of the DC impulse transformer 3 in FIG. 3 and to a special winding 32 of the DC impulse transformer 3 in FIG. 4. Aside from the fact that the arrangement of FIG. 4 requires a special winding, the arrangements of FIGS. 3 and 4 enjoy the same advantages as the arrangement of FIG. 1.

CORROSION PHASE OF INVENTION

In accordance with this phase of my invention, a short high-voltage high-amperage DC impulse of positive polarity is fired through the fishing water at each of a succession of spaced intervals for conventional electro-fishing purposes while a long low-voltage low-amperage DC impulse of negative polarity is fired through the water at alternate intervals to repair the anode-corrosion and cathode-calcification damage occasioned by the electro-fishing impulse without, at the same time, reorienting the fish.

FIG. 5

FIG. 5 illustrates differential alternations of a discontinuous AC. One alternation comprises a short high-voltage high-amperage DC impulse 50 of positive polarity. The other alternation is in the form of a long low-voltage low-amperage DC impulse 51 of negative polarity. Assuming 40 pulses per second, then the beginning of a given positive pulse 50 will be spaced from the beginning of the next successive positive pulse 50 by a time interval of 25 milli-seconds. The same will be true as to the beginning of each negative counter-balancing pulse 51.

For the sake of clarity I assume: that each pulse 50 is an electro-fishing impulse 50 having a duration of 3/10 of one milli-second and a peak voltage of 750 volts acting against a resistance of 0.1 ohm to produce a peak current of 7500 amps. Each time such a pulse is discharged through the water, it will establish (for 3/10 of one milli-second) a positive electrical field around the "electro-fishing" anode. The voltage gradient of that momentary electrical field will decline as it extends outwardly successively through an inner narcosis section and an outer taxis section.

For a given voltage gradient, the size of the taxis and narcosis sections will depend upon (and vary with) the length of the fish because the taxis and narcosis threshold voltages of fish vary with their respective lengths. As a general rule, fish 20 centimeters (approx. 8 inches) long have a fish-orienting or taxis threshold voltage of 3.5 volts and a fish-stunning or narcosis threshold voltage of 5.0 volts. This means that a 20 cm. fish will be forced to swim toward the anode when it is subjected across its 20 cm. length to a voltage drop of 3.5. Similarly, that same fish will be stunned when it is subjected to a voltage drop of 5.0 or higher.

Under the 750 volt conditions above given, a 20 cm. fish will be subject to the taxis and narcosis threshold voltages when it is spaced from the anode the distances of 3.2 meters (10.4 feet) and 2.65 meters (8.6 feet), respectively. Normally the taxis threshold voltage ranges from about 20% to about 40% below the narcosis threshold voltage.

The shape of each electro-negative counteracting or counter-balancing impulse 51 is not important so long as the impulse "duration" is long enough to effect an advantageous reduction in corrosion and calcification, and the "impulse voltage" is low enough to avoid orienting the fish in the waters embraced by the electro-positive fish-orienting field section created by the electro-fishing impulse. By "impulse voltage," I mean the voltage which is responsible for the flow of the impulse current and which determines the magnitude of its amperage.

For example, as previously pointed out, a 750 volt electro-fishing impulse 50 will subject a 20 cm. fish to an electro-positive fish-orienting threshold voltage of 3.5 volts at a distance of 3.2 meters from the electro-fishing anode. The highest impulse voltage of the corresponding counter-balancing or negative impulse 51 must be such that it will subject that same fish to a negative voltage drop not exceeding 3.5 volts when the fish is located at any point between the 2.65 and 3.2 meter thresholds of the electro-positive stunning and orienting sections. In this way, the negative impulse 51 cannot reorient the fish in the electro-positive taxis section because the negative voltage drop across the fish will be less than the threshold voltage required to do so. Since the lowest electro-positive fish-orienting threshold voltage ranges from 20 to 40% below the lowest electro-positive narcosis voltage, the highest magnitude of the negative impulse voltage should correspondingly range from 20 to 40% below that of the positive impulse voltage of the electro-fishing impulse. It may be and preferably is lower.

Actually under the 750 volt and other electrical conditions given, the highest counter-balancing impulse voltage, which can be used without orienting the fish, approximates 480 volts for a 20 cm. fish. This voltage will produce a negative drop across a 20 cm. fish equaling 3.5 volts at 2.58 meters from the electro-fishing anode, 3.25 volts at 2.65 meters therefrom and 2.23 volts at 3.20 meters therefrom.

For complete anode restoration or repair, the lowest negative impulse voltage depends upon the length of the negative impulse. The length or duration of the ideal counter-balancing impulse 51 changes inversely to any changes in its impulse voltage. For a given negative impulse voltage, its length may vary but a length should be used which insures the substantially complete elimination of corrosion and calcification.

Theoretically, if the current-time products of impulses 50 and 51 are equal, the correction of corrosion and calcification will be substantially complete, because the anode-corroding force of the electro-fishing impulse 50 and the anode-restoring force of the electro-negative impulse 51 are based on their respective current-time units or products. The current-time product of a 7500 amp. impulse which endures for 0.3 milli-second is 2250 current-time units. To effect complete counter-acting with a 480 volt (4800 amp.) counter-balancing impulse, the latter must endure for about 0.469 milli-second.

If the size of electro-fishing impulse 50 is changed so that its current-time product changes, it will be appreciated that the current-time product of the counter-balancing impulse 51 should be correspondingly changed. For example, FIG. 5 illustrates: an electro-fishing impulse 50 having a peak current of 7500 amps., which also is its average current, a duration of 0.3 milli-second and a current-time product of 2250 units; and a counter-balancing impulse 51 having a peak current of 1800 amps., a duration of 1.25 milli-seconds and a current-time product of 2250 units. However, if the peak current of impulse 50 declines from 7500 amps. to 0, in the manner indicated by the diagonal dotted line 52, its current-time product will thus be cut in half. Accordingly, the current-time product of the counter-balancing impulse 51 should also be cut in half and this may be done in any of several ways as by reducing its peak negative current to a constant value of 900 amps. as indicated by dotted line 54 or by causing its current to decline from 1800 amps. to 0 in the manner indicated by the dotted diagonal line 53 or by cutting the 1.25 milli-second duration of the original 1800 amp. impulse in half as indicated by dotted line 55.

It will be understood that, if the current-time product of the counter-balancing impulse 51 is less than the corresponding product of the electro-fishing impulse 50, corrosion will not be completely corrected. In such case, there will be a progressive loss of metal by the electro-fishing anode at a rate proportional to the pulse rate and the per pulse deficiency in the current-time product of the counter-balancing impulse 51.

FIGS. 6A AND 6B

In FIG. 6A, a generator G charges pulse storage condenser C through choke L and single wave rectifier R. Ignitron switch T is periodically closed at a desired pulse rate normally ranging from 30 to 50 pulses per second to cause condenser C to fire, through the fishing waters between electro-fishing anode 60 and cathode 61, from 30 to 50 electro-fishing impulses 62 at spaced intervals corresponding to said pulse rate.

In accordance with my invention, the foregoing circuit is arranged to fire negative counter-balancing impulses 63 at intervals alternate to the intervals during which said electro-fishing impulses 62 are fired. For this purpose, a battery 64 is connected through variable resistance 65 and choke 66 to discharge a continuous direct current 63 from electro-fishing cathode 61 through the fishing waters to electro-fishing anode 60. This current has a peak voltage which is low in comparison with the peak voltage of the electro-fishing impulses 62. During the electro-fishing firing intervals, its only effect may be to reduce the peak voltage of the electro-fishing impulse slightly. However, at alternate intervals between the firing intervals of the electro-fishing impulses 62, it forms relatively long counter-balancing impulses 63 of relatively low voltage.

At a pulse rate of 40 pulses per second, each counter-balancing impulse 63 has a duration of 24.7 milli-seconds, which is 82 times larger than the duration of 0.3 milli-second electro-fishing impulses; hence, to balance out corrosion, its average current should be approximately 82 times smaller than the average current of the electro-fishing impulse. The arrangement of FIG. 6A has the disadvantage of requiring an adjustment in the counter-balancing impulse circuit with every current-time area change in the electro-fishing pulse.

FIGS. 7A AND 7B

The use of a separate source of energy for the counter-balancing impulse may be eliminated by connecting the electro-fishing anode 60 and cathode 61 in series with the pulse storage condenser C and placing these serially connected members across the line as shown in FIG. 7A. In this circuit, each closure of ignitron T effects a rapid discharge of the pulse condenser C and thus operates to fire a short high-voltage electro-fishing impulse 62 the same as in FIG. 6A. After each discharge, the generator G operates through choke L to recharge the pulse storage condenser C at a relatively slow rate; hence, a relatively long counter-balancing impulse 73 of relative low voltage and low amperage results. In this case, the sum, of the positive DC electro-fishing current and the negative DC counter-balancing current, is zero automatically regardless of pulse frequency or voltage.

FIGS. 8A AND 8B

In FIG. 8A, the generator G tends constantly to charge the large storage condenser C through choke L and rectifier R; ignitron switch T1 controls the discharging action of pulse condenser 80 and contemporaneously controls the charging action on pulse condenser 90; while alternately operating ignitron switch T2 contemporaneously controls the reverse charging and discharging actions.

Since choke L and condenser C in the charging circuit of generator G endow that circuit with the characteristics of an oscillating circuit, it is operative to charge condenser C to a plus voltage considerably higher than the terminal voltage of generator G. However, the charging circuit is inoperative to oscillate back and forth because rectifier R prevents the fully charged condenser C from discharging back through the generator G.

The closure of ignitron switch T1 not only connects charged pulse condenser 80 across the primary 82 of implse stepup transformer 83 but also connects storage condenser C across discharged pulse condenser 90 at the same time. The first connection causes pulse condenser 80 to discharge a short high-voltage high-amperage DC impulse of the electro-fishing type in the direction of arrow 81 through primary 82 of impulse step-up transformer 83. The second connection causes the fully charged storage condenser C to discharge a short high-voltage high-amperage DC impulse in the same direction at the same time through primary 82 and also into pulse condenser 90 until the latter is fully charged.

Energy, discharged from pulse condenser 80 and from storage condenser C, thus passes through primary 82 of impulse step-up transformer 83 wherein a part of its total energy is transferred to flow successively through the secondary thereof, transmission lines 84 and voltage-step-down impulse transformer 85 to the electro-fishing electrodes comprising anode 86 and cathode 87 so that a composite electro-fishing impulse 100 is fired through the water. When pulse condensers 80 and 90 stand discharged and charged, respectively, switch T1 will open.

At the beginning of the discharge of impulse 100, the voltage of storage condenser C is considerably higher than the opposing terminal voltage of generator G. As the discharge of pulse 100 continues, the voltage of condenser C drops. At some time between the beginning and end of impulse 100, the voltage of condenser C drops below the generator voltage. As soon as this occurs, the generator G operates through choke L and rectifier R to recharge the slightly discharged storage condenser C.

The magnitude of this charging current slowly rises, reaching a small value at the end of the electro-fishing pulse. Thereafter the charging current continues slowly to rise to a maximum value and then slowly falls to zero. In this way, generator G produces a charging current which, in relation to impulse 100, is in a form of a longer impulse of lower voltage and lower amperage. A part of the total energy of this impulse charging current is transferred from primary 82 of impulse transformer 83 to the secondary thereof over a relatively long period causing counter-balancing impulse 101 of low-voltage and low-amperage to be fired from electro-fishing cathode 87 to electro-fishing anode 86.

The circuit, by which generator G charges storage condenser C, also includes primary 92 of impulse step-up transformer 93. As a consequence, some of the energy (of the impulse charging current) passing through primary 92 of impulse step-up transformer 93, is also transferred successively through the secondary thereof, transmission lines 94, step-down impulse transformer 95 and the voltage step-down impulse transformer 95 to the electro-fishing electrodes comprising anode 96 and cathode 97 so that a counter-balancing impulse 102, which is similar in size, shape and duration to counter-balancing impulse 101, is fired from electro-fishing cathode 97 to electro-fishing anode 96.

At a pulse rate of 40 pulses per second, the opening of ignitron switch T1 will be followed by the closure of ignitron switch T2 approximately 24.7 milli-seconds later. In closing, T2 operates not only to connect charged pulse condenser 90 across the primary 92 of impulse step-up transformer 93 but also to connect storage condenser C across discharging pulse condenser 80. The first connection causes pulse condenser 90 to discharge a short high-voltage high-amperage DC impulse of the electro-fishing type in the direction of arrow 91 through primary 92 of impulse step-up impulse transformer 93. The second connection causes the fully charged storage condenser C to discharge a short high-voltage high-amperage DC impulse of the same type in the same direction through primary 92 and also into pulse condenser 80 until the latter is fully charged. Energy discharged from pulse condenser 90 and from storage condenser C thus passes through primary 92 wherein it is transferred to flow through impulse transformer 93, transmission lines 94 and impulse transformer 95 to the electrodes 96–97 in the manner previously explained so that electro-fishing anode 96 fires a composite DC electro-fishing impulse 103, which normally is identical in size, shape, duration and direction to impulse 100.

It will be understood that the discharge of electro-fishing impulse 103 will be followed first by the contemporaneous discharge of counter-balancing impulses 102 between electrodes 97 and 96 and 101 between electrodes 87 and 86 and thereafter by the discharge of another electro-fishing impulse 100 between electro-fishing anode 86 and cathode 87.

With a peak and average voltage of 750 volts, a peak and average current of 7500 amps., and a pulse length of 0.3 (or 1.0) milli-second for each of the electro-positive impulses 101 and 103, the current-time product will be equal to 2250 (or 7500) units. If the highest negative impulse current is 5000 amperes, the negative impulse length must approximate .45 (or 1.5) milli-seconds to produce the current-time product of 2250 (or 7500) units required for complete correction of corrosion and calcification. If we increase the negative impulse length, we can decrease its average current. Thus, with a pulse frequency of 40 pulses per second, the maximum negative pulse length increases to 24.7 (or 23.5) milli-seconds while the corresponding magnitude of the negative impulse current decreases to 91.0 (or 319) amperes for complete correction of corrosion and calcification.

CORROSION IN FIGS. 1–4

It will be appreciated that the cycle of positive and negative primary currents illustrated in FIG. 2 will be reproduced in the secondary thereof. With a 4:1 step-down impulse transformer, the magnitude of the secondary currents will be approximately four times (4×'s) greater than that of the primary currents. Accordingly, if we assume that the positive and negative pulse current data of Table I applies to the impulse transformer primary of FIGS. 1–2, then the corresponding data for the positive and negative pulses, which the secondary fires through the fishing waters, i.e. the fishing water pulse current data, may be illustrated in Table II as follows:

TABLE II

| Fishing Waters | Electro-Fishing Impulse | Electro-Negative or Reverse Current | | |
|---|---|---|---|---|
| | | 40 P/S | 60 P/S | 90 P/S |
| | | MS/NP For AC-Cyc $t$ of 25 MS | MS/NP For AC-Cyc $t$ of 16.7 MS | MS/NP For AC-Cyc $t$ of 11.1 MS |
| Pulse Time ($t$), ms | 0.3 | 24.7 | 16.4 | 10.8 |
| Peak Amps. (4:1 Ratio) | 10,000. | 27.32 | 41.2 | 62.48 |
| Aver. Amps. (Iam) | 2,250 | 27.32 | 41.2 | 62.48 |
| $t$×Iam | 675. | 675. | 675. | 675. |

It will also be appreciated that the circuit arrangements illustrated in FIGS. 3–4 will also result in differential AC being fired through the fishing waters with a corresponding correction of the corrosion-calcification conditions and without any undesirable re-orienting of the fish by the negative pulses.

SUMMARY

In summary, it will be noted: (1) that the average current flow over a given time interval determines the amount of electrode corrosion (or of corrosion correction) while the peak value of the impulse voltage determines the location of the fish-orienting threshold for fish of a given length and specie; (2) that this invention makes it possible to obtain all of the advantages of (continuous or discontinuous) AC and of electro-fishing DC impulses without being subject to the disadvantages thereof; and (3) that, more particularly, this invention resides in the use of a differential AC (a) which is easily producible, readily-transmittable and readily-transformable, (b) which will permit the use of electro-fishing impulse transformers of any given size at power handling capacities far greater than was heretofore possible, (c) which will orient the fish in the same manner as conventional DC electro-fishing impulses, and (d) which will minimize electrode corrosion.

Symmetrical AC patent

My U.S. Patent #3,180,047, granted Apr. 27, 1965, has a disclosure, which, among other things, includes the use of symmetrical AC composed of spaced electro-fishing DC impulses in one direction and equivalent impulses of corresponding high-voltage, high amperage and short duration in the opposite direction.

Differential AC applications

My copending application S.N. 110,078 filed May 15, 1961, now abandoned, discloses the use, in DC impulse transformers handling electro-fishing impulses, of differential AC composed of spaced electro-fishing DC impulses which create a transformer magnetizing effect in one direction and of longer, lower-voltage, lower-amperage counter-balancing DC impulses which create a beneficial counter-magnetizing effect in the opposite direction.

My copending application, S.N. 198,666, now abandoned, discloses: (1) the differential AC transformer subject matter of S.N. 110,078; and (2) the use, in the fishing waters, of differential AC composed of (a) spaced electro-fishing DC impulses which, while electrically affecting the fish, damage the anode and cathode electrodes and (b) longer lower-voltage lower-amperage counter-balancing DC impulses which repair the electrode damage effected by the electro-fishing impulses and do not electrically affect the fish to any appreciable degree. S.N. 198,666 is restricted to method claims.

My copending application, S.N. 349,586, filed Mar. 5, 1964, is a continuation-in-part of S.N. 198,666, now abandoned, and is filed primarily to cover the apparatus subject matter of S.N. 198,666.

In these subjects matter, each electro-fishing impulse establishes an electro-positive field of electro-fishing intensity for fish of a given size and specie while each counter-balancing impulse establishes an electro-negative field of relatively ineffectual intensity for said fish.

MISCELLANEOUS

Where the electrodes are stationary, a succession of positive electro-fishing impulses will create a corresponding succession of momentary electro-positive fish-orienting field sections in the same location; hence, the waters embraced by such field section remain the same. In this case, the peak magnitude of the lower negative voltage is insufficient to establish an electro-negative fish-orienting electrical field section which reaches appreciably into the waters embraced by said electro-positive fish-orienting field section.

To all intents and purposes, the same thing is true in a trawling operation. While the electrodes here are constantly moving forward, the distance over which they move during any two successive electrically-opposite pulses is extremely small. For example, a trawler moving at 11,305 meters per hour (7.0 miles per hour) traverses a distance of not more than .0785 meter (3.06 inches) every 25 milli-seconds. Trawlers usually travel at speeds ranging from 3.5 to 7.0 miles per hour.

It will be appreciated that an electro-negative impulse may be separated into an equivalent succession of two or more successive impulses. For example, the electro-negative impulse 51 of FIG. 5 may be separated along dotted line 55 into two successive impulses, each having the same voltage and amperage as impulse 51 but only one-half the duration thereof.

Having described my invention, I claim:

1. A method for electrifying fishing waters by flowing an electrical current through the waters between electro-fishing electrodes, comprising:
  (A) flowing DC impulses, of the short-duration, high-voltage, high-amperage electro-fishing type, in one direction at spaced intervals between the electrodes; and
  (B) counter-flowing a DC current, of relatively longer duration and lower voltage than the DC impulses, in the opposite direction at alternate intervals between the electrodes,
    (1) said counter-flowing current having a peak voltage insufficient to orient the fish, and a duration long enough to enable the counter-flowing current to effect a substantial repair of electrode damage caused by said DC impulses.

2. The method of claim 1 wherein:
  (A) said counter-flowing step is performed for sufficiently long time intervals to provide a current-time based anode-restoring force which is substantially equivalent to the current-time based anode-corroding force provided by said DC impulses of the first flowing step.

3. The method of claim 1 including:
  (A) flowing an electro-positive impulse current, composed of spaced primary impulses of the short-duration, high-peak-voltage, high-peak-amperage, electro-fishing type, in one direction through the primary winding of a DC impulse transformer of the electro-fishing type having a pair of inductively-coupled windings including primary and secondary; and
  (B) during the intervals between said spaced primary impulses, counter-flowing, in the opposite direction through a winding of said transformer, an electro-negative current of lower voltage and lower amperage and of sufficiently longer duration to provide the core of said transformer with a current-time based counter-magnetizing force capable of reversing the transformer-core magnetism caused by said electro-positive primary impulse current.

4. The method of claim 3 wherein:
  (A) said step of counter-flowing negative current through a transformer winding is performed long enough to provide a current-time based counter-magnetizing force which is substantially equivalent to the current-time based magnetizing force provided by the flow of said electro-positive impulse current.

5. A method for electrifying electro-fishing waters by flowing a differential AC through the fishing waters between submerged electro-fishing anode and cathode electrodes, comprising:
  (A) flowing through said fishing waters an electro-positive, electro-fishing impulse current which provides the electro-positive alternations of said AC,
    (1) the impulses of said electro-positive current
      (a) being of the short duration, high-peak-voltage, high-peak-amperage type, which create, throughout a given area around the electro-fishing anode, an electro-positive field intensity above the electro-taxis threshold for fish of a given size and specie; and
  (B) contemporaneously counter-flowing through said fishing waters an electro-negative impulse current, which provides the electro-negative alternations of said AC,
    (1) the impulses of said electro-negative current
      (a) having a peak-voltage and peak-amperage of such lower magnitude than said electro-positive impulses as will create, in said given area around said electro-fishing anode, an electro-negative field intensity below said electro-taxis threshold, and
      (b) providing, between successive electro-positive impulses, an electro-negative current flow which is sufficiently longer in duration, than that of said electro-positive impulses, as will cause said negative current substantially to counteract the corroding effect of said positive current on said anode.

6. The method of claim 5 including:
  (A) flowing an electro-positive type of impulse current in one direction through the primary winding of a DC impulse transformer of the electro-fishing type having a pair of inductively-coupled windings including primary and secondary
    (1) said primary winding current
      (a) being composed of spaced primary impulses of the short-duration, high-peak-voltage, high-peak-amperage, electro-fishing type, and
      (b) providing the core of said transformer with a current-time based magnetizing force in one magnetic direction; and
  (B) during the intervals between said spaced primary impulses, counter-flowing an electro-negative current in the opposite direction through a winding of said transformer,
    (1) said electro-negative current being, in relation to said spaced primary impulses, of lower voltage and lower amperage, and of sufficiently longer duration to provide the core of said transformer with a substantially equivalent current-time based magnetizing force in the opposite magnetic direction.

References Cited

UNITED STATES PATENTS

| | | | |
|---|---|---|---|
| 2,470,895 | 5/1949 | Marlowe et al. | 320—1 |
| 2,745,205 | 5/1956 | Kafka | 43—17.1 |
| 2,764,832 | 10/1956 | Kreutzer | 43—17.1 |
| 2,830,178 | 4/1958 | White. | |
| 2,836,735 | 5/1958 | Kreutzer | 43—17.1 |
| 2,916,640 | 12/1959 | Pearson | 307—106 |
| 3,005,280 | 10/1961 | Vang | 43—4.5 |
| 3,009,278 | 11/1961 | Dethloff | 43—4.5 |
| 3,043,041 | 7/1962 | Kreutzer | 43—17.1 |

SAMUEL KOREN, *Primary Examiner.*

WARNER H. CAMP, *Examiner.*